April 4, 1950     D. C. GIRARD     2,502,646
ARC WELDING CIRCUIT
Filed Jan. 16, 1948
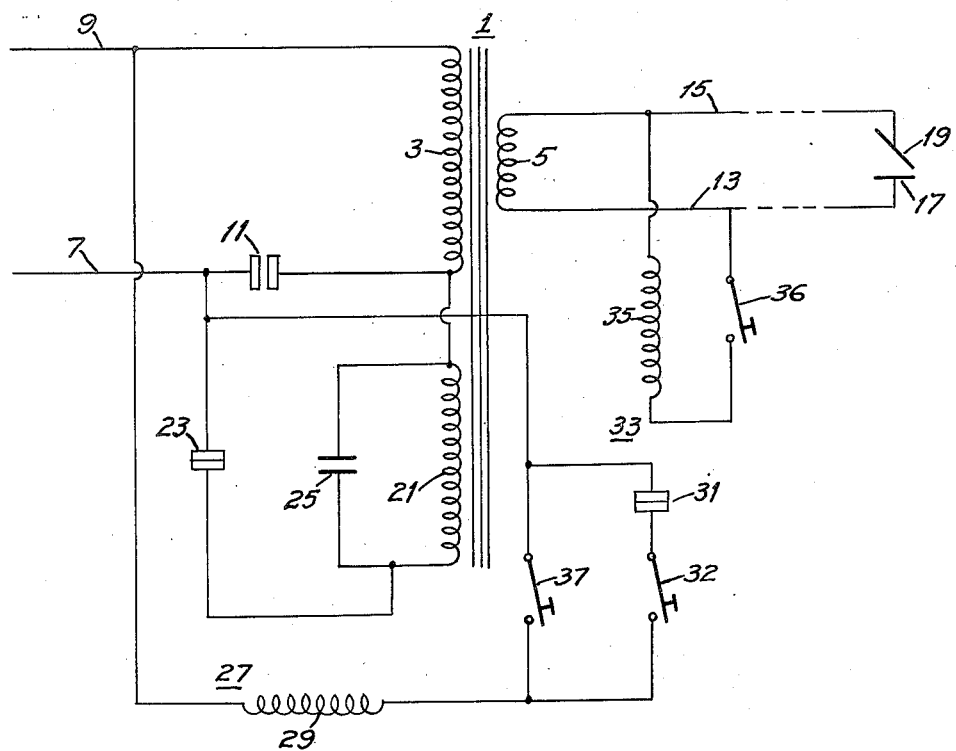
INVENTOR.
DEAN C. GIRARD
BY
Bruce & Brosler
HIS ATTORNEYS Patented Apr. 4, 1950

2,502,646

UNITED STATES PATENT OFFICE 2,502,646

ARC WELDING CIRCUIT

Dean C. Girard, San Leandro, Calif., assignor, by mesne assignments, to National Cylinder Gas Company, a corporation of Delaware Application January 16, 1948, Serial No. 2,691

10 Claims. (Cl. 315—271)

My invention relates to arc welding, and more particularly to voltage control in an alternating current arc welding circuit.

In the matter of alternating current arc welding, it is conventional practice to design the power transformer to provide an open circuit voltage across the secondary winding, of the order of 80 volts, which is hereinafter designated as normal welding voltage. While such voltage is reasonably safe so far as human life is concerned, a workman, during hot or damp conditions, is nonetheless apt to experience unpleasant tingling sensations in handling the electrode under such conditions and at such voltage.

Attempt to obviate this by lowering the open circuit voltage of the transformer, has resulted in a transformer of smaller physical dimensions and one which consequently lacked the combination of reactance and voltage essential to sustain a smooth arc.

Among the objects of my invention are:

(1) To provide a novel and improved welding circuit which controls the open circuit voltage so that it is held to a value substantially below normal welding voltage, while permitting normal welding voltage during welding periods;

(2) To provide a novel and improved welding circuit capable of functioning efficiently at lower-than-normal welding voltage;

(3) To provide a novel and improved welding circuit characterized by ease of starting;

(4) To provide a novel and improved welding circuit which automatically adjusts for power factor correction;

(5) To provide a novel and improved welding circuit capable of fulfilling all of the aforementioned objects.

Additional objects of my invention will be brought out in the following description of a preferred embodiment of the same, taken in conjunction with the accompanying drawing wherein the single figure is a circuit diagram illustrating my novel and improved welding circuit.

Referring to the drawing for details of my invention in its preferred form, the circuit involves a power transformer 1 having a primary winding 3 and a secondary winding 5. The primary winding has a pair of leads 7 and 9 extending therefrom for connection to a power source (not shown), one of such leads including a pair of normally open contacts 11 while the secondary winding is provided with a pair of leads 13 and 15 for connection to arc electrodes, one of which may constitute the work 17 while the other might constitute a weld rod 19.

Suitable provisions are made for maintaining, during non-welding periods, a lower-than-normal welding voltage across the secondary winding, so that during such non-welding periods, a workman will not be exposed to unpleasant tingling sensations, should he accidentally close the secondary winding circuit through his body.

Such provisions include a winding 21 shunting the normally open contacts 11 through a pair of normally closed contacts 23 whereby such winding will normally be in series with the primary winding. With such winding in series with the primary winding of the transformer, the voltage impressed across the primary winding from the power source will accordingly be reduced, thus lowering the open circuit voltage across the secondary winding of the transformer to a value substantially below what has been designated as normal welding voltage.

When shunted by a suitable capacitor 25, such series included winding may at the same time function as a power factor correction winding to improve the power factor of the circuit during use.

When initiating a welding cycle or period under the aforementioned conditions, it becomes desirable that the normal welding voltage be reestablished across the secondary winding of the transformer and preferably in response to the striking of an arc, whereby the workman will at no time be exposed to an open circuit voltage of a value corresponding to the normal welding voltage. With this in mind, means is provided for conditioning the circuit thus far described, so that such normal welding voltage will be restored immediately upon shorting the secondary winding in the act of striking an arc.

Such conditioning means involves a relay 27 embodying both the normally open contacts 11 and the normally closed contacts 23, said relay including a coil 29 connected to the power supply through a pair of normally closed contacts 31 and a circuit make-and-break device 32.

The last mentioned normally closed contacts 31 are part of a second relay 33 having a coil 35 connected across the secondary winding of the transformer through a switch 36 or other circuit make-and-break device, such second relay being designed to be energizable at normal welding voltage and de-energizable at voltages below the lower-than-normal welding voltage which exists during non-welding periods.

The operation of the circuit conditioning feature of the present invention takes place after switch 36 is closed and when the first relay 27 is energized upon the closing of the switch 32. Energization of this relay, in turn, closes the normally open contacts 11 and opens the normally closed contacts 23 associated with such relay. Full voltage is thus impressed across the primary winding of the transformer, which in turn develops normal welding voltage across the secondary winding of the transformer, and this voltage being of a value sufficient to energize the second relay 33, causes its normally closed contacts 31 to open and thus de-energize the first relay 27 and re-establish the lower-than-normal welding voltage across the secondary winding. The relay 33, however, remains energized at this voltage, as previously indicated, and thus holds the contacts 31 open, whereby the circuit maintains its low voltage condition.

Such operation of the conditioning feature is but of momentary duration and serves to leave the circuit in a condition for responding immediately to the striking of an arc, to re-establish normal welding voltage across the secondary winding. Thus, upon bringing the arc electrodes together in the act of striking an arc, the voltage across the secondary winding drops, due to its reactance and drooping power curve, from the prevailing lower-than-normal welding value to a still lower value sufficient to deenergize the second relay and permit its contacts to close. When this happens, the first relay is again energized to bring about full voltage across the primary winding, which in turn will establish the normal welding voltage across the secondary winding.

Such normal welding voltage will continue to be applied so long as the arc continues. Upon extinguishing of the arc, however, to again establish the open circuit condition, the existing normal welding voltage will immediately energize the second relay, thereby opening its associated contacts and deenergizing the first relay, with the result that the power factor correction winding will again be connected in series with the primary winding, to reestablish the lower-than-normal welding voltage across the secondary winding of the transformer while at the same time functioning as a power factor correction winding. The second relay, not being deenergizable in response to this lower-than-normal welding voltage, will remain in its energized state and thereby hold the circuit in readiness for immediate response to the striking of an arc, to again establish the normal welding voltage across the secondary winding during a welding period.

Should it be desired to maintain normal welding voltage across the secondary winding under open circuit conditions, this can very readily be accomplished by a connection across the series connected switch 32 and contacts 31 of the second relay, through a switch 37. This connection, when completed through the switch, nullifies the action of the second relay and serves to maintain the first relay energized at all times, whereby the normally closed contacts will close and remain closed to maintain full voltage across the primary winding at all times so long as the switch 37 remains closed.

By disconnecting the first relay 27 from the circuit, the circuit then becomes adjusted for welding at the lower-than-normal welding voltage across the secondary winding. All previous attempts to arc weld at such lower voltage have not been very satisfactory. It is noted that under the conditions existing in the present circuit with the first relay disconnected, the power factor control winding remains in series with the primary winding of the transformer and this adds sufficient reactance to the circuit to maintain a continuous and smooth arc, thus affording a low current range for welding, heretofore not feasible.

The circuit thus described is very flexible in its adaptations, and in order to permit ready changeover from one adaptation to another, I prefer to embody the contacts of the switches 32, 36 and 37 into a single drum switch, whereby the desired condition of the switches for each adaptation of the circuit may be realized through a partial rotation of the drum.

Thus with switches 32, 36 and 37 all open, the circuit is adapted for low current welding. No voltage control is necessary under these conditions and none will occur. With switches 32 and 36 closed and switch 37 open, welding at normal voltage will occur, and the automatic voltage control will function to lower this normal welding voltage during non-welding periods. By closing only switch 37, normal welding voltage will appear across the secondary winding 5 at all times, and no control will exist.

From the above description of my invention in its preferred form, it will be appreciated that the same fulfills all the objects previously recited therefor, and while I have described and illustrated such embodiment in considerable detail, I do not desire to be limited in my protection to such details, except as may be necessitated by the appended claims.

I claim:

1. An arc welding circuit comprising a transformer having a primary winding and a secondary winding, said transformer being adapted to provide normal welding voltage across said secondary winding in response to a predetermined voltage impressed across said primary winding; a pair of leads extending from said primary winding for connection to a power source; a pair of leads extending from said secondary winding for connection to arc electrodes; a high reactance winding in series with said primary winding for lowering said welding voltage to a lower-than-normal value, said winding having sufficient reactance to maintain a smooth arc across such electrodes at said lower-than-normal value, and relay means responsive to the voltage across said secondary winding for connecting said primary winding for energization directly across said power source.

2. An arc welding circuit comprising a transformer having a primary winding and a secondary winding, said transformer being adapted to provide normal welding voltage across said secondary winding in response to a predetermined voltage impressed across said primary winding; a pair of leads extending from said primary winding for connection to a power source; a pair of leads extending from said secondary winding for connection to arc electrodes; a power factor correction winding in series with said primary winding for lowering said welding voltage to a lower-than-normal value, said winding having sufficient reactance to maintain a smooth arc across such electrodes at said lower-than-normal value, and relay means responsive to the voltage across said secondary winding for connecting said primary winding for energization directly across said power source.

3. An arc welding circuit comprising a transformer having a primary winding and a secondary winding, said transformer being adapted to provide normal welding voltage across said secondary winding in response to a predetermined voltage impressed across said primary winding; a pair of leads extending from said primary winding for connection to a power source; a pair of leads extending from said secondary winding for connection to arc electrodes; a high reactance winding in series with said primary winding for lowering said welding voltage to a lower-than-normal value, a condenser across said high reactance winding, said high reactance winding having sufficient reactance to maintain a smooth arc across such electrodes at said lower-than-normal value; and means precluding removal of said high reactance winding from said circuit when an arc is struck between such electrodes.

4. An arc welding circuit comprising a transformer having a primary winding and a secondary winding; a pair of leads extending from said primary winding for connection to a power source; a pair of leads extending from said secondary winding for connection to arc electrodes; impedance means for maintaining during non-welding periods, a lower-than-normal welding voltage across said secondary winding; and relay means for conditioning said circuit for change-over to normal welding voltage on the secondary winding in response to striking of an arc between said arc electrodes at said lower-than-normal welding voltage.

5. An arc welding circuit comprising a transformer having a primary winding and a secondary winding; a pair of leads extending from said primary winding for connection to a power source, one of said leads including a pair of normally open contacts; a pair of leads extending from said secondary winding for connection to arc electrodes; means for maintaining during non-welding periods, a lower-than-normal welding voltage across said secondary winding, said means including a winding shunting said normally open contacts through a pair of normally closed contacts to normally place said winding in series with said primary winding; and relay means for conditioning said circuit for change-over to normal welding voltage on the secondary winding in response to striking of an arc between said arc electrodes at said lower-than-normal welding voltage.

6. An arc welding circuit comprising a transformer having a primary winding and a secondary winding; a pair of leads extending from said primary winding for connection to a power source, one of said leads including a pair of normally open contacts; a pair of leads extending from said secondary winding for connection to arc electrodes; means for maintaining during non-welding periods, a lower-than-normal welding voltage across said secondary winding, said means including a power factor correction winding shunting said normally open contacts through a pair of normally closed contacts to normally place said power factor correction winding in series with said primary winding; and means for conditioning said circuit for change-over to normal welding voltage on the secondary winding in response to striking of an arc between said arc electrodes at said lower-than-normal welding voltage, said means including a relay embodying both said normally open and normally closed contacts, said relay including a coil connected in circuit across a portion of said primary winding through a pair of normally closed contacts, and a second relay embodying said last mentioned normally closed contacts and having a coil connected across said secondary winding, said second relay being energizable at normal welding voltage and deenergizable at voltages below said lower-than-normal welding voltage.

7. An arc welding circuit comprising a transformer having a primary winding and a secondary winding; a pair of leads extending from said primary winding for connection to a power source, one of said leads including a pair of normally open contacts; a pair of leads extending from said secondary winding for connection to arc electrodes; means for maintaining during non-welding periods, a lower-than-normal welding voltage across said secondary winding, said means including a power factor correction winding shunting said normally open contacts through a pair of normally closed contacts to normally place said power factor correction winding in series wth said primary winding; means for conditioning said circuit for change-over to normal welding voltage on the secondary winding in response to striking of an arc between said arc electrodes at said lower-than-normal welding voltage, said means including a relay embodying both said normally open and normally closed contacts, said relay including a coil connected in circuit across a portion of said primary winding through a pair of normally closed contacts, and a second relay embodying said last mentioned normally closed contacts and having a coil connected across said secondary winding, said second relay being energisable at normal welding voltage and deenergisable at voltages below said lower-than-normal welding voltage; and means for selectively rendering said second relay ineffective whereby to operate said arc welding circuit with normal welding voltage across the secondary winding during non-welding periods.

8. An arc welding circuit comprising a transformer having a primary winding and a secondary winding; a pair of leads extending from said primary winding for connection to a power source, one of said leads including a pair of normally open contacts; a pair of leads extending from said secondary winding for connection to arc electrodes; means for maintaining during non-welding periods, a lower-than-normal welding voltage across said secondary winding, said means including a power factor correction winding shunting said normally open contacts through a pair of normally closed contacts to normally place said power factor correction winding in series with said primary winding; means for conditioning said circuit for change-over to normal welding voltage on the secondary winding in response to striking of an arc between said arc electrodes at said lower-than-normal welding voltage, said means including a relay embodying both said normally open and normally closed contacts, said relay including a coil connected in circuit across a portion of said primary winding through a pair of normally closed contacts, and a second relay embodying said last mentioned normally closed contacts and having a coil connected across said secondary winding, said second relay being energizable at normal welding voltage and deenergizable at voltages below said lower-than-normal welding voltage; and means for selectively operating said welding circuit to weld at said lower-than-normal welding voltage with the aid of said power factor correction winding.

9. An arc welding circuit comprising a transformer having a primary winding and a secondary winding; a pair of leads extending from said primary winding for connection to a power source; a pair of leads extending from said secondary winding for connection to arc electrodes; impedance means for maintaining during non-welding periods, a lower-than-normal welding voltage across said secondary winding; relay means for conditioning said circuit for change-over to normal welding voltage on the secondary winding in response to striking of an arc between said arc electrodes at said lower-than-normal welding voltage; switch means for selectively operating said arc welding circuit with normal welding voltage across the secondary winding during non-welding periods; and switch means for selectively operating said welding circuit at said lower-than-normal welding voltage.

10. An arc welding circuit comprising a transformer having a primary winding and a secondary winding; a pair of leads extending from said primary winding for connection to a power source, one of said leads including a pair of normally open contacts; a pair of leads extending from said secondary winding for connection to arc electrodes; means for maintaining during non-welding periods, a lower-than-normal welding voltage across said secondary winding, said means including a power factor correction winding shunting said normally open contacts through a pair of normally closed contacts to normally place said power factor correction winding in series with said primary winding; means for conditioning said circuit for change-over to normal welding voltage on the secondary winding in response to striking of an arc between said arc electrodes at said lower-than-normal welding voltage, said means including a relay embodying both said normally open and normally closed contacts, said relay including a coil connected in circuit across a portion of said primary winding through a pair of normally closed contacts, and a second relay embodying said last mentioned normally closed contacts and having a coil connected across said secondary winding, said second relay being energizable at normal welding voltage and deenergizable at voltages below said lower-than-normal welding voltage; means for selectively nullifying the function of said second relay whereby to operate said arc welding circuit with normal welding voltage across the secondary winding during non-welding periods, said means including a connection across the contacts of said second relay through a circuit make-and-break device; and means for selectively operating said welding circuit at said lower-than-normal welding voltage with the aid of the high reactance of said power factor correction winding, said means comprising switch mechanism including said circuit make-and-break device for disconnecting the coil of said primary winding associated relay from said circuit.

DEAN C. GIRARD.

REFERENCES CITED

The following references are of record in the file of this patent:

UNITED STATES PATENTS

| Number | Name | Date |
|---|---|---|
| 1,305,362 | Holslag | June 3, 1919 |
| 1,480,857 | Flood | Jan. 15, 1924 |
| 2,374,930 | Gray | May 1, 1945 |